United States Patent [19]

Patil et al.

[11] Patent Number: 5,070,284
[45] Date of Patent: Dec. 3, 1991

[54] FAIL-SAFE VARIABLE DAMPING SUSPENSION FOR A MOTOR VEHICLE

[75] Inventors: Prabhakar B. Patil, Southfield; John M. Miller, Saline; Md. A. Masrur, West Bloomfield, all of Mich.

[73] Assignee: Ford Motor Company, Dearborn, Mich.

[21] Appl. No.: 640,719

[22] Filed: Jan. 14, 1991

[51] Int. Cl.[5] .......................................... B60G 17/015
[52] U.S. Cl. ................................... 318/362; 318/558; 188/266
[58] Field of Search .............. 318/114, 436, 362, 558; 310/152, 156; 188/266, 267, 279, 290; 74/89.15

[56] References Cited

U.S. PATENT DOCUMENTS

| | | |
|---|---|---|
| 3,941,402 | 3/1976 | Yankowski et al. |
| 4,526,401 | 7/1985 | Kakizaki et al. |
| 4,620,619 | 11/1986 | Emura et al. |
| 4,666,180 | 5/1987 | Shirakuma |
| 4,729,459 | 3/1988 | Inagaki et al. |
| 4,815,575 | 3/1989 | Murty |
| 4,846,317 | 7/1989 | Hudgens |
| 5,028,073 | 7/1991 | Harms et al. .................. 280/840 |
| 5,034,670 | 7/1991 | Tominaga ....................... 318/436 |

*Primary Examiner*—Bentsu Ro
*Attorney, Agent, or Firm*—Raymond L. Coppiellie; Roger L. May

[57] ABSTRACT

A fail-safe variable damping suspension system for a motor vehicle controls the oscillatory spring movements of each wheel via a permanent magnet rotary electric machine which is connected to machine control circuitry by normally open contacts of a relay. In the event of failure of the suspension system, the relay is released and the machine takes the form of a permanent magnet alternator which is connected to a defined load via normally closed contacts of the relay. Thus, in the event of a failure of the suspension system, the machine control circuitry is disabled and all shock absorbers are set to a fail-safe mode by the defined load upon closure of the normally closed contacts of the relay.

20 Claims, 2 Drawing Sheets

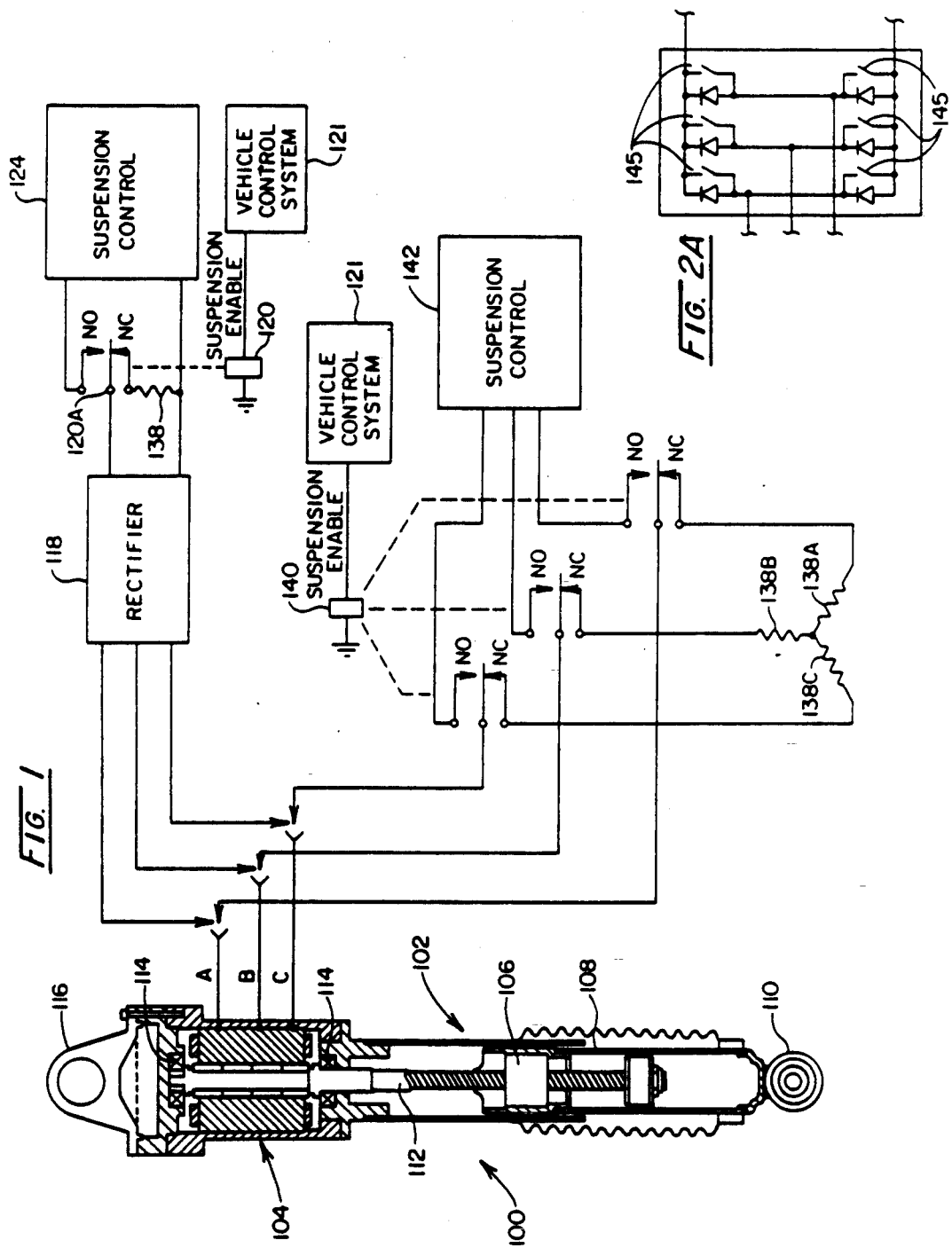

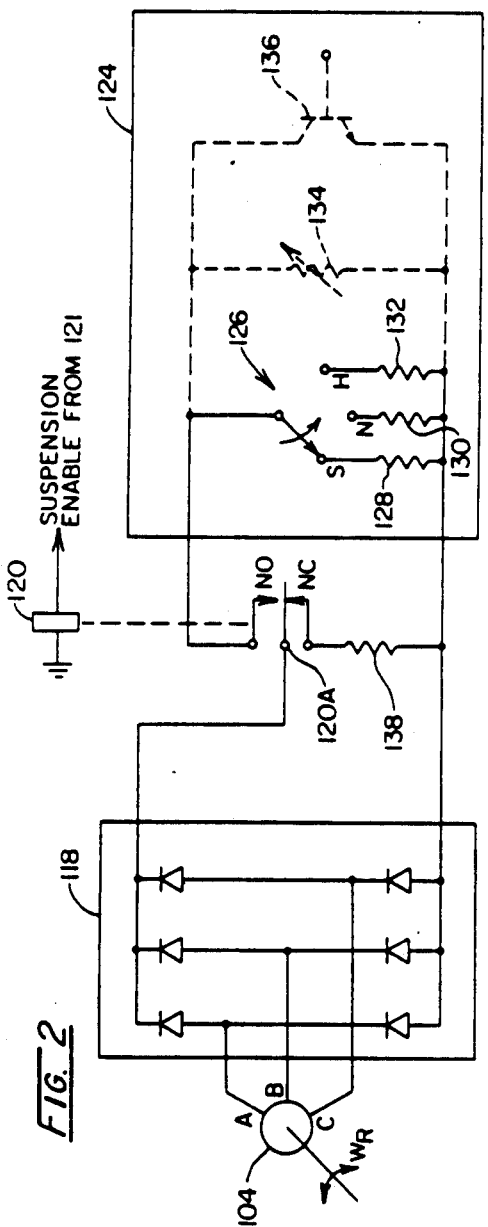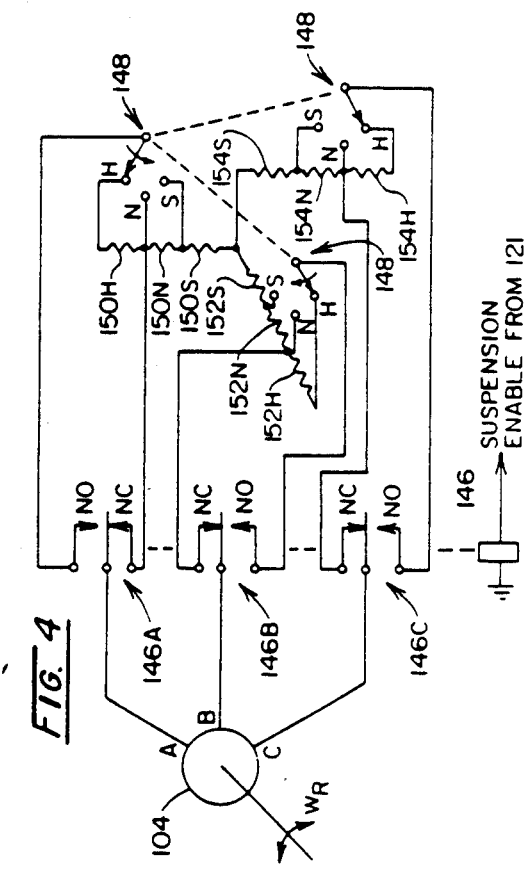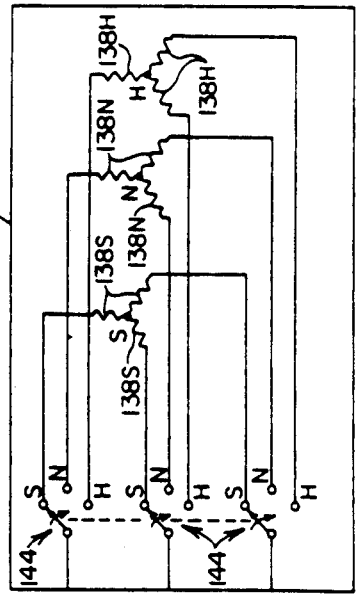

FAIL-SAFE VARIABLE DAMPING SUSPENSION FOR A MOTOR VEHICLE

BACKGROUND OF THE INVENTION

The present invention relates generally to suspension systems for motor vehicles and, more particularly, to a suspension system in which damping is controlled either passively, semi-actively or actively and which defines a fail-safe damping rate for the suspension in the event of failure within the suspension system.

When a motor vehicle is driven, springs in its suspension system compress and expand to absorb shocks which would otherwise be transmitted to occupants of the vehicle. Once deflected, the springs continue to oscillate until they eventually return to their original state. Since spring oscillations create handling problems and reduce ride comfort of the vehicle, shock absorbers are used to dampen the oscillations of the springs and thereby stabilize the suspension system and return the springs to their original state substantially more quickly.

Dependent on the road conditions and driving preferences of an operator of a vehicle, the damping rate defined by shock absorbers may vary from slow or soft, for a smoother ride, to fast or hard, for better handling and control of the vehicle. Normally, an intermediate damping position is selected as a compromise between ride comfort and vehicle handling. Since driving conditions and operator preferences vary, a number of suspension systems have been developed which allow the operator of a motor vehicle including the suspension system to select the spring damping characteristics of the shock absorbers. Variable suspension systems often permit an operator to select a "soft" suspension or a "hard" suspension depending on the current road conditions and driver preference. Most variable suspension systems also provide a "normal" damping selection which is somewhat intermediate the soft and hard selections and closely akin to the conventional compromise damping provided by systems which cannot be varied.

In variable damping suspension systems, there is a concern for what damping rates will be applied in the event of a failure within the system. For example, if one shock absorber is set to hard and the remaining three shock absorbers are set to soft, the handling characteristics of the vehicle will be substantially less than desirable. A number of solutions have been proposed to overcome these failure problems in motor vehicle variable damping suspension systems.

U.S. Pat. No. 4,526,401 proposes one such solution for a three position variable damping suspension system wherein the time between a commanded damping level and the attainment of that level is monitored with a fault condition being identified for excessive time periods. If a fault is identified, a damping force command signal for all shock absorbers of the system is set to a normal or medium damping force such that the difference in damping force between a failed shock absorber and the remaining shock absorbers is no more than one damping level.

U.S. Pat. No. 4,666,180 discloses a variable damping force motor vehicle suspension system wherein the operating time of actuators of all shock absorbers of a vehicle are monitored by a first circuit. If the operating time of the first circuit is exceeded, power is still provided from a second circuit in a continuing attempt to set a failed shock absorber. If a time period defined by the second circuit is exceeded, the power is removed from the system. In the best case of either of the disclosed failure handling arrangements, it is probable that the suspension system will be disabled in a state with one shock absorber applying a damping rate which is different than the other three shock absorbers, possibly substantially different.

U.S. Pat. No. 4,815,575 discloses a motor vehicle shock absorber with a controlled variable damping rate wherein the damping of the vehicle suspension system is controlled by providing a three phase alternator which is connected to a resistor through a rectifier and chopper circuit. By monitoring the motion of the suspension, a secondary control current is provided to the resistor via the chopper circuit to control the power which is generated in the alternator of the suspension system and dissipated in the resistor to thereby control the damping rate of the suspension. Unfortunately, in the event of failure within the control circuit which disables the chopper circuit, the shock absorber operates free of any electrically induced damping such that it is reduced to an ineffectively low damping rate defined by the mechanical and frictional forces inhibiting movement of the shock absorber.

It is thus apparent that a need exists for a controlled damping motor vehicle suspension system which defines a fail-safe damping rate for the suspension in the event of failure of the suspension. In such a suspension system, the damping rate of all of the shock absorbers would be set to the fail-safe damping rate under substantially all failure modes. Preferably, such a system would be electrically operable to substantially preclude inhibiting the fail-safe feature by mechanical failure with a shock absorber.

SUMMARY OF THE INVENTION

This need is met by the motor vehicle fail-safe variable damping suspension system of the present invention wherein the oscillatory spring movements of each wheel are damped by a permanent magnet rotary electric machine which may be either actively controlled to vary and control the damping rate of the suspension system or passively controlled to vary the damping rate of the suspension system. The permanent magnet electric machine, or motor/alternator, is connected to active or passive variable damping control means by switch means comprising normally open contacts of a relay in the presently preferred embodiment. In the event of failure within the suspension system, the machine takes the form of an alternator and is connected to a defined load via normally closed contacts of the relay. Thus, in the event of a power failure, a detected failure within the suspension system control means or, in the case of an active control system, the system is turned off due to insufficient signal levels of road signal inputs, all shock absorbers can be set to the fail-safe mode by closure of the normally open contacts of one relay or more than one commonly controlled relay upon the release of the one or more relays.

In accordance with one aspect of the present invention, a fail-safe variable damping suspension for a motor vehicle having sprung and unsprung masses comprises a permanent magnet rotary electric machine. A ball screw and nut apparatus connects the sprung and unsprung masses and rotates with the machine in alternate rotary directions as the sprung and unsprung masses move relative to one another. Controller means provide varying control for the machine to vary the damping rate of the suspension. Switch means connect the controller means to the machine and, in the event of failure within the suspension system, the switch means connect a defined load to the machine to define a fail-safe damping rate for the suspension system.

In accordance with another aspect of the present invention, a fail-safe variable damping suspension for a motor vehicle having sprung and unsprung masses comprises a permanent magnet rotary electric alternator. A ball screw and nut apparatus connects the sprung and unsprung masses and rotates the alternator in alternate rotary directions as the sprung and unsprung masses move relative to one another. Electric load means provide a varying load for the alternator and switch means connect the load means to the alternator. Selector means provide a plurality of selectable connections to vary the load connected to the alternator and thereby vary the damping rate of the suspension. In the event of failure within the suspension system, the switch means connects a defined load to the alternator to define a fail-safe damping rate for the suspension system.

In accordance with yet another aspect of the present invention, a fail-safe variable damping suspension for a motor vehicle having sprung and unsprung masses comprises a permanent magnet rotary electric alternator. A ball screw and nut apparatus connects the sprung and unsprung masses and rotates the alternator in alternate rotary directions as the sprung and unsprung masses move relative to one another. Electric load means provides a varying load for the alternator and switch means connect the load means to the alternator. In the event of failure within the suspension system, the switch means connects a defined load to the alternator to define a fail-safe damping rate for the suspension system.

In accordance with still another aspect of the present invention, a fail-safe suspension system for a motor vehicle having sprung and unsprung masses comprises a permanent magnet rotary electric motor/alternator. A ball screw and nut apparatus connect the sprung and unsprung masses and rotate with the electric motor/alternator in alternate rotary directions as the sprung and unsprung masses move relative to one another. Control means are connected to drive the electric motor/alternator for actively controlling the suspension system and switch means connect the control means to the motor/alternator. In the event of failure within the suspension system, the switch means connects a defined load to the motor/alternator to define a fail-safe damping rate for the suspension.

Preferably, the permanent magnet electric machine is a multiphase machine. In one embodiment of the present invention, the electric machine comprises an electric alternator and the controller means comprises electric load means for providing a varying load for the alternator. The controller means may comprise selector means for providing a plurality of selectable connections to vary the load connected to the alternator to thereby vary the damping rate of the suspension. For this embodiment, the electric load means comprises a plurality of electrical load resistances which are selectively connected to the alternator by the selector means. Alternately, the electric load means may comprise a variable resistor or the controlled resistance of a power transistor. To reduce the number of electrical load resistors or variable resistors required for a given application, the electric load means may comprise rectifier means for converting alternating output signals from the alternator to a direct current signal. The switch means preferably comprise normally open contacts of one or more electrically operated relays such that the fail-safe damping is initiated by releasing the relays either under circuit control in the event of a sensed fault condition or as the natural result of a vehicle power failure.

It is thus a feature of the present invention to provide a controlled damping suspension system for a motor vehicle which defines a fail-safe damping rate for the suspension in the event of failure within the system; to provide a controlled damping fail-safe suspension system for a motor vehicle wherein sprung and unsprung masses are interconnected via a permanent magnet rotary electric machine which rotates in alternate rotary directions as the masses move relative to one another with the machine being connected to a defined load in the event of failure within the system to operate as an alternator and thereby define a fail-safe damping rate for the suspension; and, to provide a controlled damping fail-safe suspension system for a motor vehicle wherein sprung and unsprung masses are interconnected via a permanent magnet rotary electric machine which rotates in alternate rotary directions as the masses move relative to one another with the machine being connected via normally closed contacts of at least one relay to connect the machine to a defined load in the event of failure within the system to operate as an alternator and thereby define a fail-safe damping rate for the suspension.

Other features and advantages of the invention will be apparent from the following description, the accompanying drawings and the appended claims.

BRIEF DESCRIPTION OF THE DRAWINGS

FIG. 1 shows a single suspension damping unit or shock absorber and two alternate control embodiments including the fail-safe damping of the present invention;

FIG. 2 is an schematic circuit diagram of one of the control arrangements of FIG. 1 including alternate variable damping control circuitry;

FIG. 2A shows an inverter circuit for use of an active suspension control system in the upper control system embodiment of FIG. 1;

FIG. 3 is a schematic diagram of a suspension control circuit of one of the control arrangements of FIG. 1; and FIG. 4 is an additional control embodiment including the fail-safe damping of the present invention.

DETAILED DESCRIPTION OF THE INVENTION

With reference to FIG. 1, a single suspension damping unit or shock absorber 100 comprises a linear-to-rotary motion converter 102 and a rotary multiphase permanent magnet electric machine 104. For the fail-safe damping of the present invention, the machine 104 takes the form of a permanent magnet three phase alternator; however, it can operate as a motor for active control of the shock absorber 100. The linear-to-rotary motion converter 102 comprises a ball screw and nut apparatus wherein a ball screw cage 106 is connected by a hollow, rigid connector 108 to a lower mounting eye 110 which may be connected to a lower control arm of vehicle wheel support (not shown) in a well known manner.

A screw threaded shaft 112 is rotatably attached through bearing assemblies 114 to an upper mounting eye 116 which can be connected to a motor vehicle body (not shown) in a well known manner. The ball screw cage 106 is forced to move axially with the vehicle wheel support relative to the vehicle body and thus moves back and forth axially with suspension travel. As the screw threads on the shaft 112 move through the ball screw cage 106, the shaft 112 is forced to rotate in alternate rotary directions as the wheel support and motor vehicle body move relative to one another with the direction of rotation of the shaft 112 being determined by the direction of linear motion.

The upper end of the screw threaded shaft 112 carries the armature of the electric machine 104. When the machine 104 is operated as an alternator, such as in the fail-safe mode of the present invention, electric currents are generated by rotation of the armature by the interaction of the screw thread with the ball screw cage 106. Electric currents are passed to or from the machine 104 via connectors A, B and C which connect the three stator phase windings of the motor 104 to controller means for actively or passively controlling the shock absorber 100. Two embodiments of controller means including the present invention are shown as being alternately connected to the connectors A, B and C in FIG. 1.

The control means of the upper embodiment of FIG. 1 comprises rectifier means for converting alternating output signals from the machine 104 operating as an alternator to a direct current (dc) signal. The rectifier means preferably comprises a three phase full wave rectifier bridge circuit 118 best shown in FIG. 2. The dc signal from the bridge circuit 118 is passed to a common terminal 120A of a relay having an operating coil 120. For normal operation of the shock absorber 100, the relay 120 is operated via a suspension enable signal generated by a vehicle control system 121 which monitors the vehicle suspension system. A number of vehicle control systems are known in the art. Since the structure and philosophy of the vehicle control system 121 are not important to the present invention beyond the generation of a suspension enable signal, they will not be described herein.

If the relay 120 is operated, normally open (NO) contacts of the relay 120 are closed to pass the dc signal from the machine 104 to suspension control circuitry 124 one embodiment of which is shown in FIG. 2. The suspension control circuitry 124 may comprise selector means for providing a plurality of selectable connections to vary the load connected to the machine 104 or alternator to thereby vary the damping rate of the suspension system. The selector means may comprise a multiple position switch, for example a three position switch 126, which selectively connects the dc signal to a plurality of electrical load resistances, three load resistors 128 (soft, S), 130 (normal, N) and 132 (hard, N) shown in FIG. 2, which correspond to and define desired damping characteristics for the suspension system. Alternately, variable damping characteristics can be selectively defined by means of a variable resistor or potentiometer 134 or power transistor 136 which is controlled to define a plurality of selected resistance values or a continuously variable range of resistance values.

On the other hand, in accordance with the present invention, if the relay 120 is not operated or released due to a power or suspension system failure, normally closed (NC) contacts of the relay 120 are closed to pass the dc signal from the machine 104 to a defined load comprising a fail-safe resistance 138 to define a fail-safe damping rate for the suspension system. Preferably, the fail-safe damping rate corresponds substantially to a normal or compromise damping rate which is commonly selected for suspension systems which cannot be varied and therefore must provide a damping rate which is a compromise between handling and comfort.

The control means of the lower embodiment of FIG. 1 eliminates the three phase full wave rectifier bridge circuit 118 but requires three resistance elements 138A, 138B and 138C in place of the fail-safe resistance 138 of the upper embodiment of FIG. 1. Three sets of normally open NO and normally closed NC contacts are also provided on the suspension enable relay 140. While the suspension system is thus somewhat more complicated and requires some additional circuit elements, it is convenient to make the suspension control circuitry 142 for this embodiment in the form of an active control system since all three phases of the machine 104 are available to the suspension control circuitry 142 instead of being buffered through the three phase full wave rectifier bridge circuit 118 required in the embodiments shown in FIGS. 1 and 2.

Of course, an active suspension control circuit is not required in the lower embodiment of FIG. 1 as shown by the suspension control circuitry 142A of FIG. 3. In the suspension control circuitry 142A, three resistance elements 138S, three resistance elements 138N and three resistance elements 138H are provided together with a ganged three position switch 144 wherein all gangs of the three position switch 144 are operated as one switch. While wye connections are shown for the resistance elements 138A-C, 138S, 138N and 138H it should be apparent that delta connections are equally applicable.

For use of an active suspension control system in the upper embodiment of FIG. 1, the bridge circuit 118 can be replaced by an inverter circuit 118A shown in FIG. 2A. For this configuration, electronic switches 145 of the inverter circuit 118A, which are controlled for active operation of the suspension system, are inhibited from operation during power or suspension system failure. Accordingly, the inverter circuit 118A is effectively converted to a bridge circuit for fail-safe operation in accordance with the present invention as previously described.

Another alternate embodiment of a variable damping fail-safe shock absorber in accordance with the present invention is shown in FIG. 4. In this embodiment, the same resistance elements are utilized for both the selection of a desired damping rate for the suspension system and to provide the fail-safe feature of the present invention. A suspension enable relay 146 includes three sets of contacts 146A, 146B and 146C for connecting the three phases of the machine 104 to a series of wye connected resistors through normally open contacts NO via a ganged three position switch 148. Each leg of the wye connected resistors comprises three separate or tapped resistors 150S, 150N, 150H; 152S, 152N, 152H; and 154S, 154N, 154H. For the soft setting, all three resistors XS, XN, XH in each leg are connected to the machine 104. For the normal setting, only two of the resistors XS, XN in each leg are connected to the machine 104. And, for the hard setting, only one of the resistors XS in each leg is connected to the machine 104.

For fail-safe damping, the suspension enable relay 146 is released such that the two resistors in each leg of the wye connected resistors XS, XN which define the normal damping position for the suspension system are connected to the machine 104 via the normally closed NC contacts of the relay 146. This embodiment reduces the number of resistors required by the embodiment of FIG. 3 by three resistors.

In accordance with the disclosed embodiments of the present invention and other alternate embodiments which will be apparent to those skilled in the art from the foregoing disclosure, the variable damping shock absorbers for a motor vehicle assume a fail-safe damping rate for failures of the system such as: failure or under voltage within the vehicle electrical system; a fault condition within the suspension system itself; or, for an active control system, if the road inputs are insufficient to require full active damping.

Having thus described the fail-safe variable damping suspension system of the present invention in detail and by reference to preferred embodiments thereof, it will be apparent that modifications and variations are possible without departing from the scope of the invention defined in the appended claims.

What is claimed is:

1. A fail-safe variable damping suspension for a motor vehicle having sprung and unsprung masses comprising:
   a permanent magnet rotary electric machine;
   a ball screw and nut apparatus connecting the sprung and unsprung masses and rotating with said machine in alternate rotary directions as the sprung and unsprung masses move relative to one another;
   controller means for providing varying control for said machine to vary the damping rate of the suspension; and
   switch means for connecting said controller means to said machine, said switch means, in the event of failure of the suspension, connecting a defined load to said machine to define a fail-safe damping rate for said suspension.

2. A fail-safe variable damping suspension for a motor vehicle having sprung and unsprung masses as claimed in claim 1 wherein said electric machine comprises an electric alternator and said controller means comprises electric load means for providing a varying load for said alternator.

3. A fail-safe variable damping suspension for a motor vehicle having sprung and unsprung masses as claimed in claim 2 wherein said electric load means comprises rectifier means for converting alternating output signals from said alternator to a direct current signal.

4. A fail-safe variable damping suspension for a motor vehicle having sprung and unsprung masses as claimed in claim 2 wherein said electric alternator is a multiphase alternator.

5. A fail-safe variable damping suspension for a motor vehicle having sprung and unsprung masses as claimed in claim 2 wherein said controller means further comprises selector means for providing a plurality of selectable connections to vary the load connected to said alternator to thereby vary the damping rate of the suspension.

6. A fail-safe variable damping suspension for a motor vehicle having sprung and unsprung masses as claimed in claim 5 wherein said electric load means comprises a plurality of electrical load resistances which are selectively connected to said alternator by said selector means.

7. A fail-safe variable damping suspension for a motor vehicle having sprung and unsprung masses as claimed in claim 6 wherein one of said load resistances corresponds to said defined load and said switch means comprises normally closed contacts for connecting said defined load to said alternator.

8. A fail-safe variable damping suspension for a motor vehicle having sprung and unsprung masses as claimed in claim 7 wherein said switch means comprises a relay.

9. A fail-safe variable damping suspension for a motor vehicle having sprung and unsprung masses comprising:
   a permanent magnet rotary electric alternator;
   a ball screw and nut apparatus connecting the sprung and unsprung masses and rotating said alternator in alternate rotary directions as the sprung and unsprung masses move relative to one another;
   electric load means for providing a varying load for said alternator;
   first and second switch means for connecting said load means to said alternator; and
   selector means providing a plurality of selectable connections to vary the load connected to said alternator and thereby vary the damping rate of the suspension and, in the event of failure of the suspension, said first switch means connecting a defined load to said alternator to define a fail-safe damping rate for said suspension.

10. A fail-safe variable damping suspension for a motor vehicle having sprung and unsprung masses as claimed in claim 9 wherein said rotary electric alternator is a multiphase alternator.

11. A fail-safe variable damping suspension for a motor vehicle having sprung and unsprung masses as claimed in claim 10 wherein said electric load means comprises a plurality of electrical load resistances which are selectively connected to said alternator by said second switch means.

12. A fail-safe variable damping suspension for a motor vehicle having sprung and unsprung masses as claimed in claim 11 wherein one of said load resistances corresponds to said defined load and said first switch means comprises normally closed contacts for connecting said defined load to said alternator.

13. A fail-safe variable damping suspension for a motor vehicle having sprung and unsprung masses as claimed in claim 12 wherein said first switch means comprises a relay.

14. A fail-safe variable damping suspension for a motor vehicle having sprung and unsprung masses as claimed in claim 13 wherein said electric load means comprises rectifier means for converting alternating output signals from said alternator to a direct current signal.

15. A fail-safe variable damping suspension for a motor vehicle having sprung and unsprung masses comprising:
   a permanent magnet rotary electric alternator;
   a ball screw and nut apparatus connecting the sprung and unsprung masses and rotating the alternator in alternate rotary directions as the sprung and unsprung masses move relative to one another;
   electric load means for providing a varying load for said alternator; and
   switch means for connecting said load means to said alternator, in the event of failure of the suspension, said switch means connecting a defined load to said alternator to define a fail-safe damping rate for said suspension.

16. A fail-safe variable damping suspension for a motor vehicle having sprung and unsprung masses as claimed in claim 15 wherein said electric load means comprises a variable resistor.

17. A fail-safe variable damping suspension for a motor vehicle having sprung and unsprung masses as claimed in claim 16 wherein said switch means comprises normally closed contacts for connecting said defined load to said alternator.

18. A fail-safe suspension for a motor vehicle having sprung and unsprung masses comprising:
   a rotary electric motor/alternator;
   a ball screw and nut apparatus connecting the sprung and unsprung masses and rotating with said electric motor/alternator in alternate rotary directions as the sprung and unsprung masses move relative to one another;
   control means connected to drive said electric motor/alternator for actively controlling said suspension; and
   switch means for connecting said control means to said motor/alternator and, in the event of failure of the suspension, said switch means connecting a defined load to said motor/alternator to define a fail-safe damping rate for said suspension.

19. A fail-safe suspension for a motor vehicle having sprung and unsprung masses as claimed in claim 18 wherein said rotary electric motor/alternator is a multi-phase motor/alternator.

20. A fail-safe suspension for a motor vehicle having sprung and unsprung masses as claimed in claim 19 wherein said switch means comprises normally closed contacts for connecting said defined load to said motor/alternator.

* * * * *